(12) United States Patent
Tsujimura

(10) Patent No.: US 8,467,113 B2
(45) Date of Patent: Jun. 18, 2013

(54) IMAGE READING APPARATUS PROVIDED WITH AN EXCHANGEABLE IMAGE READING PORTION

(75) Inventor: Tatsuya Tsujimura, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 140 days.

(21) Appl. No.: 13/016,287

(22) Filed: Jan. 28, 2011

(65) Prior Publication Data

US 2011/0188101 A1 Aug. 4, 2011

(30) Foreign Application Priority Data

Jan. 29, 2010 (JP) ................................. 2010-018478

(51) Int. Cl.
*H04N 1/04* (2006.01)
(52) U.S. Cl.
USPC ............ 358/498; 399/121; 399/124; 399/126
(58) Field of Classification Search
USPC ............................ 358/497–498; 399/121–126
See application file for complete search history.

(56) References Cited

U.S. PATENT DOCUMENTS

2009/0086276 A1* 4/2009 Tanaka .......................... 358/401

FOREIGN PATENT DOCUMENTS

JP 2004-336270 A 11/2004

* cited by examiner

*Primary Examiner* — Benny Q Tieu
*Assistant Examiner* — Marcellus Augustin
(74) *Attorney, Agent, or Firm* — Buchanan Ingersoll & Rooney PC

(57) ABSTRACT

A image reading apparatus 4 includes the exchangeable image reading portion 38, the document transportation path 30 curved so as to move around the image reading portion 38, the skew correction rollers 35 in the hosing 3a. The skew correction rollers 35 are arranged on the document transportation path 30 at the transportation upstream side with respect to the reading position 46 of the image reading portion 38. The image reading portion 38 passes through the document transportation path 30 at the transportation upstream side with respect to the skew correction rollers 35 so as to be detached from and attached to the housing 3a.

2 Claims, 11 Drawing Sheets

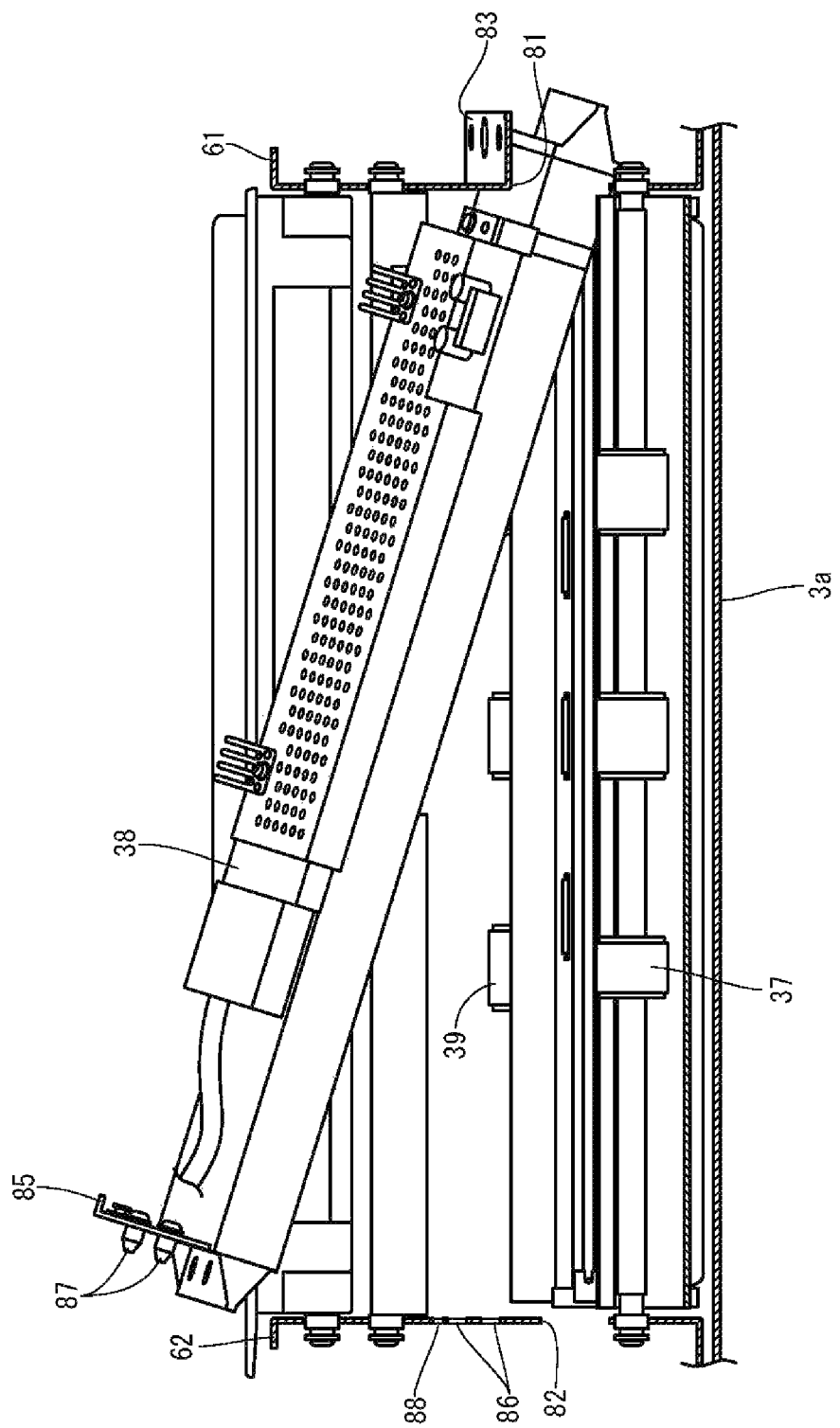

IMAGE READING APPARATUS PROVIDED WITH AN EXCHANGEABLE IMAGE READING PORTION

CROSS-REFERENCE TO RELATED APPLICATIONS

This application is based on application No. 2010-18478 filed in Japan, the entire content of which is hereby incorporated by reference.

BACKGROUND OF THE INVENTION

1. Field of the Invention

The present invention relates to a sheet through type image reading apparatus which reads an image on a document while being transported by an image reading portion which cannot be moved.

2. Related Art

In a sheet through type image reading apparatus, an exchangeable image reading portion and a document transportation path which is curved so as to move around the image reading portion when viewed from the side are included in a housing. As an image reading portion employed in an image reading apparatus of this type, a Contact Image Sensor (CIS) which is light weight and small in size is used in many cases so as to be arranged in a narrow space. The CIS has a narrow focal depth when an image is read. Therefore, an image reading roller is provided so as to be opposed to a reading position of the CIS and a space between the CIS and the reading roller is kept to be narrow so that an image on a document which passes through the space is read. When an image is read, the reading position of the CIS and a document is slid contact with each other so as to easily generate static electricity. In particular, static electricity is significantly generated under an environment of low humidity. Such static electricity may cause malfunction or failure of the CIS. Therefore, exchange frequency of the CIS is high among electrical parts constituting the image reading apparatus.

In terms of this point, a following configuration has been disclosed in Japanese Unexamined Patent Publication No. 2004-336270. That is, a reading roller which is arranged so as to be opposed to a reading position of a CIS is detachably inserted to an opening. The opening is provided at a lower surface side of a housing. Further, the CIS is detached from the opening from which the reading roller has been detached in a downward direction. With such configuration, there is an advantage that workability when a service person detaches the CIS in a market can be improved.

However, in the above-described conventional configuration, the following problem is caused. That is, the reading roller which is arranged so as to be opposed to the reading position of the CIS can be detachably inserted in the above-described conventional configuration. Therefore, every time after the CIS is exchanged, the CIS is required to be attached while positioning the CIS and the reading roller at high accuracy and adjusting a space between the CIS and the reading roller and attachment postures thereof. Accordingly, even if the CIS is easily detached, time and effort for attaching the CIS are required (workability for attachment is bad).

Further, when a sufficient attachment accuracy is not ensured because attachment positions of the CIS and the reading roller are deviated, there collaterally arises a problem that an image reading accuracy by the CIS is deteriorated, or skew of a document or a paper jam is caused. That is to say, when the CIS is exchanged, it is preferable that mechanisms represented by the reading roller, which deeply relate to a document transportation accuracy or an image reading accuracy, be not attached and detached if possible. As the mechanisms which deeply relate to a document transportation accuracy or an image reading accuracy, rollers, guiding members, and the like which are arranged at a transportation downstream side with respect to a skew correction roller which corrects skew of a document are exemplified.

SUMMARY OF THE INVENTION

A technical object of the invention is to eliminate the above problems. The present inventors have studied repeatedly in order to improve the conventional techniques and have achieved the invention. The invention has multiphase applications.

An image reading apparatus according to an aspect of the invention includes an exchangeable image reading portion, a document transportation path which is curved so as to move around the image reading portion, and a skew correction roller which is arranged on the document transportation path at a transportation upstream side with respect to a reading position of the image reading portion, in a housing. In the image reading apparatus, the image reading portion passes through the document transportation path at the transportation upstream side with respect to the skew correction roller so as to be detached from and attached to the housing.

A pair of guiding members which guide transportation of a document may be provided between a sheet feeding roller and the skew correction roller on the document transportation path. In this case, it is preferable that the document transportation path at the transportation upstream side with respect to the skew correction roller be opened and the image reading portion be exposed from the opening by detaching both the guiding members from the positions constituting the document transportation path.

An opening and closing cover which can be opened and closed so as to expose or cover the document transportation path at the transportation upstream side with respect to the reading position of the image reading portion may be provided. In this case, it is preferable that the opening and closing cover at the side of the document transportation path constitute the one guiding member and the other guiding member be detachably attached to the housing.

BRIEF DESCRIPTION OF DRAWINGS

FIG. 11 is a cross-sectional view of a substantial part illustrating a detachment mode of the second document reading unit.

DESCRIPTION OF THE PREFERRED EMBODIMENTS

Hereinafter, an embodiment in which the invention is embodied will be described with reference to drawings. Note that expressions indicating specific directions and positions (for example, "right and left", and "up and down" or the like) used in the following description are only used for convenience of description and are not intended to limit a technical range of the invention. An image reading apparatus 4 according to an embodiment is mounted on a Multi Function Printer (hereinafter, referred to as MFP) 1 as an example of an image forming apparatus.

1. Outline of Image Forming Apparatus

Figure 1:
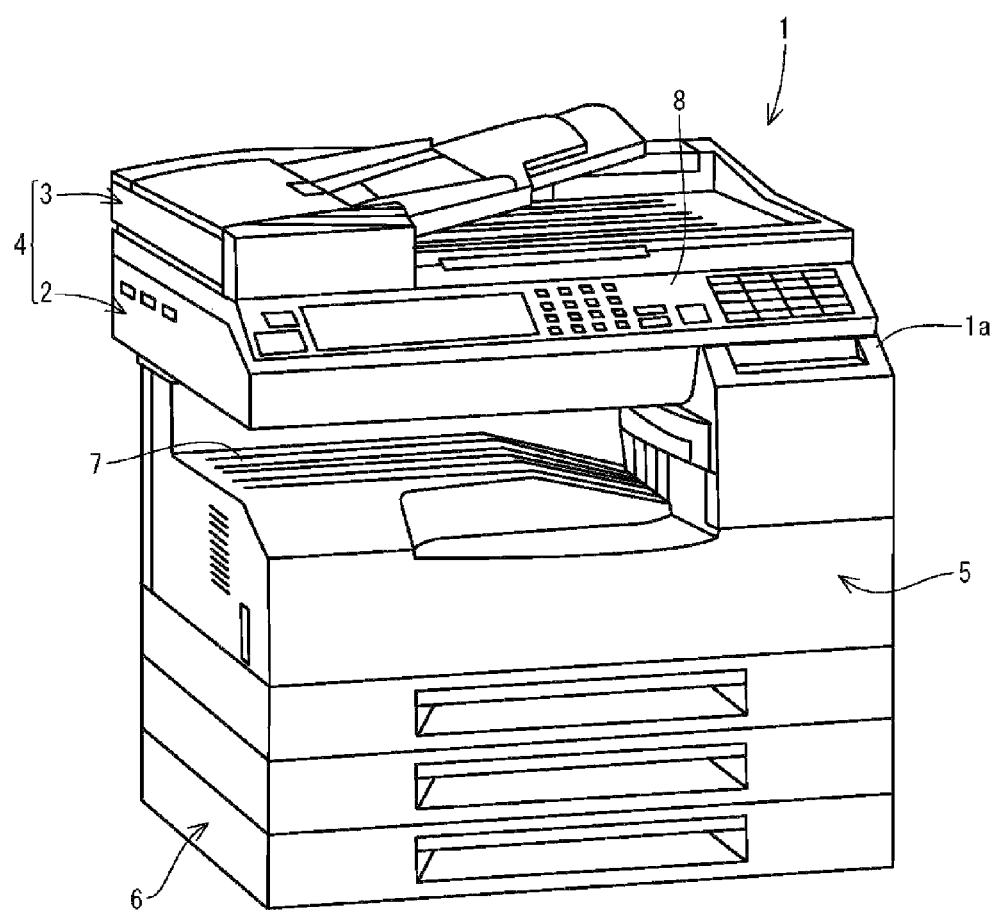
FIG. 1 is an external perspective view illustrating an image forming apparatus having an image reading function.

The MFP 1 as shown in FIG. 1 has multiple functions including a copying function, a scanner function, a printer function, and a facsimile function. The MFP 1 can transmit and receive data through a network (communication network) such as a LAN or a telephone network. That is to say, the MFP 1 can output image data read from a document to another computer through a network or input image data from another computer through a network so as to execute printing based on the image data. Further, the MFP 1 can transmit and receive facsimile data.

The image reading apparatus 4 which includes a scanner portion 2 and an automatic document feeder 3 (hereinafter, referred to as ADF) is provided on an upper portion of an apparatus main body 1a of the MFP 1. The image reading apparatus 4 is configured as follows. The scanner portion 2 and the ADF 3 are operated in synchronization with each other so as to optically read an image from each document set on the ADF 3. With this operations, image data is acquired. That is to say, the image reading apparatus 4 is configured such that the ADF 3 transports documents one by one toward the scanner portion 2 and the scanner portion 2 reads an image when a document passes through a predetermined reading position so that image data is acquired.

A sheet feeding portion 6 which accommodates recording materials is provided at a lower portion of the apparatus main body 1a. An image forming portion 5 is provided between the image reading apparatus 4 and the sheet feeding portion 6 of the apparatus main body 1a. The image forming portion 5 prints a toner image onto the recording material. The sheet feeding portion 6 supplies the recording materials one by one to the image forming portion 5. The image forming portion 5 prints a toner image onto the recording material based on the image data acquired by the image reading apparatus 4 or through a network. A concaved space between the image reading apparatus 4 and the image forming portion 5 on the apparatus main body 1a corresponds to a discharged sheet storing portion 7. The recording material onto which a toner image has been printed by the image forming portion 5 is discharged to the discharged sheet storing portion 7.

An operation panel 8 is provided on a front side (anterior surface side) of the apparatus main body 1a. The operation panel 8 has a plurality of keys (buttons). A user operates the keys while checking a display screen or the like on the operation panel 8 so as to perform setting about a function selected from various functions of the MFP 1 or instruct the MFP 1 to execute operations.

2. Configuration of Image Reading Apparatus

Next, a configuration of the image reading apparatus 4 is described with reference mainly to FIG. 2. The ADF 3 includes a sheet feeding tray 31 on which a plurality of documents M are placed (set). The documents M placed on the sheet feeding tray 31 are fed one by one starting from an uppermost document to a document transportation path 30 by a pick up roller 32 and a sheet feeding roller pair 33. Then, the document M is transported to a resist roller pair 35 as skew correction rollers through an intermediate roller pair 34. The resist roller pair 35 adjusts one document M transported to be in a predetermined posture and transports the document M toward a first transportation roller pair 36 at a predetermined timing. Then, the document M is transported on a slit glass 21 of the scanner portion 2 by the first transportation roller pair 36. The slit glass 21 is formed into a small-width long plate form which is long in a main scanning direction perpendicular to a document transportation direction and is transparent.

When the document M passes through the position on the slit glass 21, a first document reading unit 22 reads an image on a downward-facing first face (surface) on the document M. Note that the first document reading unit 22 is positioned at a lower side of the slit glass 21. A second transportation roller pair 37, a second document reading unit 38, a third transportation roller pair 39, and a sheet discharge roller 40 are arranged on the document transportation path 30 at the transportation downstream side with respect to the position on the slit glass 21. The second document reading unit 38 corresponds to an image reading portion as described in Claims. The document M which has passed through the position on the slit glass 21 is fed to a position just under the second document reading unit 38 by the second transportation roller pair 37. Then, the second document reading unit 38 reads an image on an upward-facing second face (back surface) on the document M while the document M is passing through the position. The document M which has passed through the position just under the second document reading unit 38 is discharged on a sheet discharge tray 41 by the third transportation roller pair 39 and the sheet discharge roller 40. The sheet discharge tray 41 is positioned at a lower side of the sheet feeding tray 31.

Figure 2:
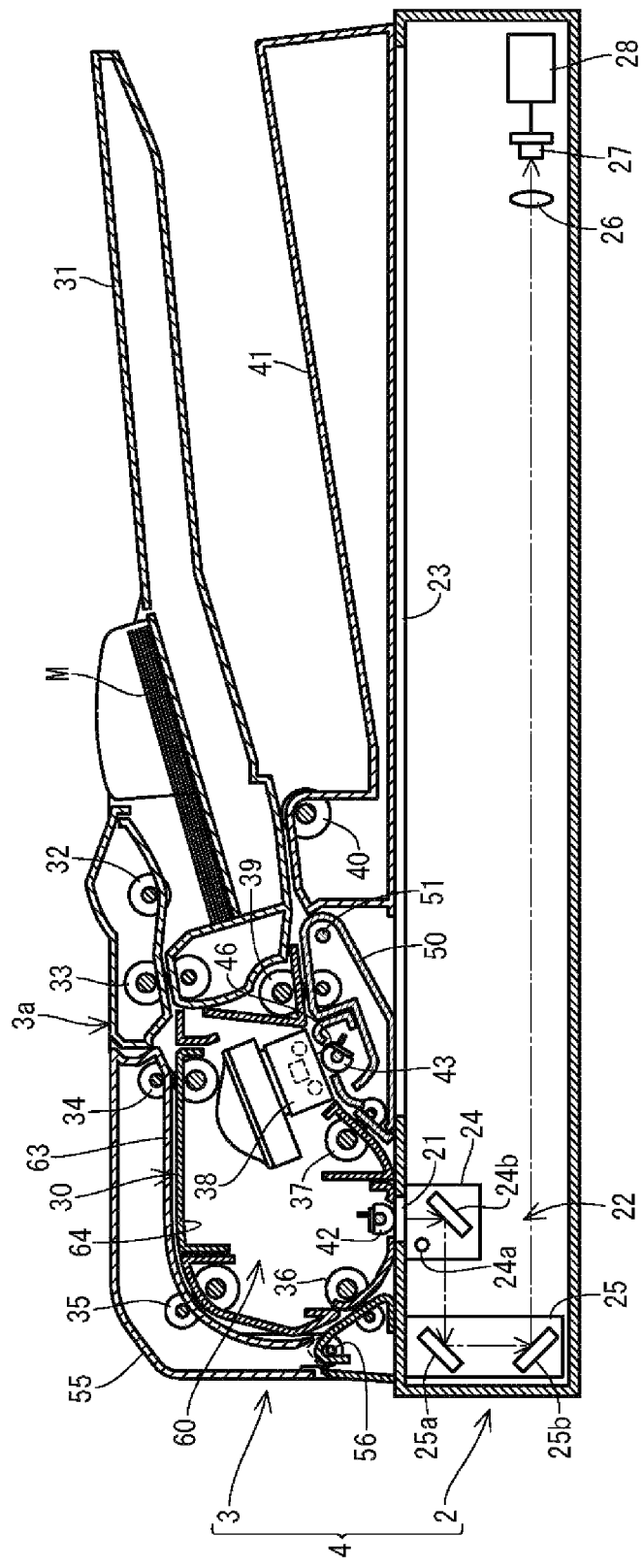
FIG. 2 is a schematic side cross-sectional view illustrating an inner configuration of an image reading apparatus.

As is obvious from FIG. 2, the document transportation path 30 in the ADF 3 is a path from the sheet feeding tray 31 to the sheet discharge tray 41 through the pickup roller 32, the sheet feeding roller pair 33, the intermediate roller pair 34, the resist roller pair 35, the first transportation roller pair 36, the position on the slit glass 21, the second transportation roller pair 37, the position just under the second document reading unit 38, the third transportation roller pair 39, and the sheet discharge roller 40. The document transportation path 30 is a substantially horseshoe-shaped (curved) path when viewed from the side. The second document reading unit 38 is arranged at an inner side of the document transportation path 30 which is the horseshoe-shaped path when viewed from the side. In other words, the document transportation path 30 is curved so as to move around the second document reading unit 38 when viewed from the side.

A rotatable cleaning roller 42 is provided at an upper side of the slit glass 21. The cleaning roller 42 rotationally drives in a state where there is no document M on the slit glass 21 so as to remove foreign matters such as paper powder adhered onto the slit glass 21. For example, when a plurality of documents M are continuously transported in the ADF 3, the cleaning roller 42 rotationally drives in a time interval since a previous document M has passed through the position on the slit glass 21 until a subsequent document M reaches to the position so as to clean the slit glass 21. A reading roller 43 is rotatably provided at a side opposite to the second document reading unit 38 with respect to the document transportation path 30. The reading roller 43 is an example of a white reference member for shading correction.

On the other hand, the above-described slit glass 21 and a platen glass 23 are provided on an upper surface of the scanner portion 2. The platen glass 23 is formed into a flat plate form having a large width and is transparent. The above-described first document reading unit 22 is provided in the scanner portion 2. The first document reading unit 22 reads an image on the first face of a document M which passes through the position on the slit glass 21 and an image on a document M placed on the platen glass 23. Further, the first document reading unit 22 includes a scanning unit 24, a driving unit 25, an image forming lens 26 and a first line sensor 27. The scanning unit 24 has a light source 24a and a reflection mirror 24b. The driving unit 25 has a pair of reflection mirrors 25a, 25b.

When a document M passes through the position on the slit glass 21, light is irradiated toward a first face of the document M from the light source 24a in a state where the scanning unit 24 and the driving unit 25 are fixed. Then, the reflection light from the first face of the document M is introduced to the first line sensor 27 through the reflection mirror 24b, both of the reflection mirrors 25a, 25b and the image forming lens 26 so that an image is formed. Further, when an image on the document M placed on the platen glass 23 is read, light is irradiated toward a lower surface (facing surface) of the document M from the light surface 24a while the scanning unit 24 and the driving unit 25 move in the sub scanning direction. Then, the reflection light thereof is introduced to the first line sensor 27 so that an image is formed. The first line sensor 27 is formed with a Charge Coupled Device (CCD) having a plurality of photoelectric conversion elements which are arranged along the main scanning direction. The first line sensor 27 converts the formed optical image to an image signal and outputs the image signal to an image processor 28. In the image processor 28, the input image signal is subjected to an analog processing, an A/D conversion, a shading correction, an image compressive processing, and the like so as to generate a digitalized image data. Then, the digitalized image data is output to the image forming portion 5.

The second document reading unit 38 arranged in the ADF 3 in an unmovable manner reads an image on the second face of the document M which passes through a position on the reading roller 43. The second document reading unit 38 includes a pair of light sources 44a, 44b and a second line sensor 45 (see, FIG. 3). When a document M passes through the position on the reading roller 43, light is irradiated toward the second face of the document M from both of the light sources 44a, 44b. Then, the reflection lights thereof are received by the second line sensor 45 so that an image is formed. The second line sensor 45 is formed with a Contact Image Sensor (CIS) having a plurality of photoelectric conversion elements which are arranged along the main scanning direction. The second line sensor 45 also converts the formed optical image to an image signal and outputs the image signal to the image processor 28 in the same manner as the first line sensor 27. A side of the second document reading unit 38, which faces the reading roller 43, corresponds to a reading position 46 (reading surface).

A cover member 50 facing the second document reading unit 38 is provided at a bottom side of the ADF 3. The cover member 50 can be opened and closed rotationally about a supporting point 51 provided at a transportation downstream side. An inner surface of the cover member 50 at the side of the document transportation path 30 functions as a guiding surface constituting a part of the document transportation path 30 at the transportation downstream side in a state where the cover member 50 is closed. On the cover member 50, one (lower side) of the second transportation rollers 37, the reading roller 43, and one (lower side) of the third transportation rollers 39 are rotatably assembled in parallel with each other so as to be unitized. Opening trenches (not shown) corresponding to each of the rollers 37, 43, 39 are formed on the inner surface of the cover member 50 at the side of the document transportation path 30. A part of an outer circumference of each of the rollers 37, 43, 39 is exposed from each of the opening trenches. With the opening/closing rotation of the cover member 50, a range from the second transportation roller pair 37 to the third transportation roller pair 39 on the document transportation path 30 is exposed or covered.

Although not described in detail, a latch claw which engages or disengages with respect to a latch reception fragment is provided at each of side plate portions of the cover member 50 in the main scanning direction. The latch reception fragment is provided at the side of the ADF 3. The cover member 50 is made into an opened rotatable state (can be shifted into an opened state) or is made into a closed state by engaging or disengaging the latch claws with respect to the latch reception fragments. The latch claws are engaged or disengaged with respect to the latch reception fragment with the operations by an opening and closing gripper provided on the cover member 50.

The reading roller 43 as an example of a white reference member is extended in the main scanning direction and is pivotally supported in a rotatable manner by the cover member 50. An outer circumferential portion of the reading roller 43 is formed with a curved surface (roller surface) and a flat surface. Although not described in detail, the curved surface is divided into a white reference surface for shading correction and a sheet feeding surface. The white reference surface is extended in a belt form along the main scanning direction. The sheet feeding surface is in contact with the document M so as to guide the document M when the document M is transported. On the other hand, a cleaning brush made of a large number of brush hairs is implanted on the flat surface.

The sheet feeding surface of the reading roller 43 is normally exposed from the opening trench of the cover member 50. For example, when the document M passes through the position just under the second document reading unit 38, the sheet feeding surface is in contact with the document M so as to guide the document M. Further, when shading correction is performed, the reading roller 43 rotationally drives so as to make the white reference surface expose from the opening trench of the cover member 50. The cleaning brush on the flat surface is configured to be made into contact with the second document reading unit 38 appropriately by the rotational driving of the reading roller 43 in a state where the document M is not present at a position just under the second document reading unit 38. Foreign matters such as paper powder adhered to the second document reading unit 38 are swept by a cleaning brush 43c so as to be removed.

An opening and closing cover 55 is provided at an upper surface of the ADF 3. The opening and closing cover 55 can be opened and closed so as to expose or cover the document transportation path 30 at the transportation upstream side with respect to the reading position of the second document reading unit 38. The opening and closing cover 55 according to the embodiment can be opened and closed rotationally about a hinge portion 56 which is parallel with the main scanning direction in the vicinity of the first transportation roller pair 36. An inner surface of the opening and closing cover 55 at the side of the document transportation path 30 functions as an outer side guiding member 63 (which will be described in detail) constituting a part of the document transportation path 30 at the transportation upstream side in a state where the opening and closing cover 55 is closed. On the opening and closing cover 55, one (upper side) of the intermediate rollers 34 and one (upper side) of the resist rollers 35 are rotatably assembled in parallel with each other so as to be unitized. Note that the one of the intermediate rollers 34 and the one of the resist rollers 35 are long in the main scanning direction. With the opening/closing rotation of the opening and closing cover 55, a range from the intermediate roller pair 34 to the vicinity of a position immediately before the first transportation roller pair 36 on the document transportation path 30 is exposed or covered.

3. Detachment and Attachment Configurations of Second Document Reading Unit

Next, detachment and attachment configurations of the second document reading unit 38 with respect to the ADF 3 are described with reference to FIG. 3 to FIG. 11. As is obvious from the above description, the ADF 3 includes the second document reading unit 38 as an image reading portion, the document transportation path 30 curved so as to move around the second document reading unit 38 when viewed from the side, the resist roller pair 35 as skew correction rollers in the hosing 3a. The resist roller pair 35 is arranged on the document transportation path 30 at the transportation upstream side with respect to the reading position 46 of the second document reading unit 38.

An accommodation chamber 60 is provided in the housing 3a of the ADF 3. The accommodation chamber 60 is divided in the main scanning direction by a right partitioning side plate 61 and a left partitioning side plate 62 which are positioned at both sides of the accommodation chamber 60 in the main scanning direction. Members relating to document transportation and image reading of the document are positioned in the accommodation chamber 60 (between the right partitioning side plate 61 and the left partitioning side plate 62) and supported by the right partitioning side plate 61 and the left partitioning side plate 62 except the other (lower side) of the intermediate rollers 34. The members relating to document transportation and image reading of the document are pickup roller 32, the sheet feeding roller pair 33, the other (lower side) of the intermediate rollers 34, the other (lower side) of the resist rollers 35, the first transportation roller pair 36, the cleaning roller 42, the other (upper side) of the second transportation rollers 37, the second document reading unit 38, the other (upper side) of the third transportation rollers 39, and the sheet discharge roller 40.

Figure 3:
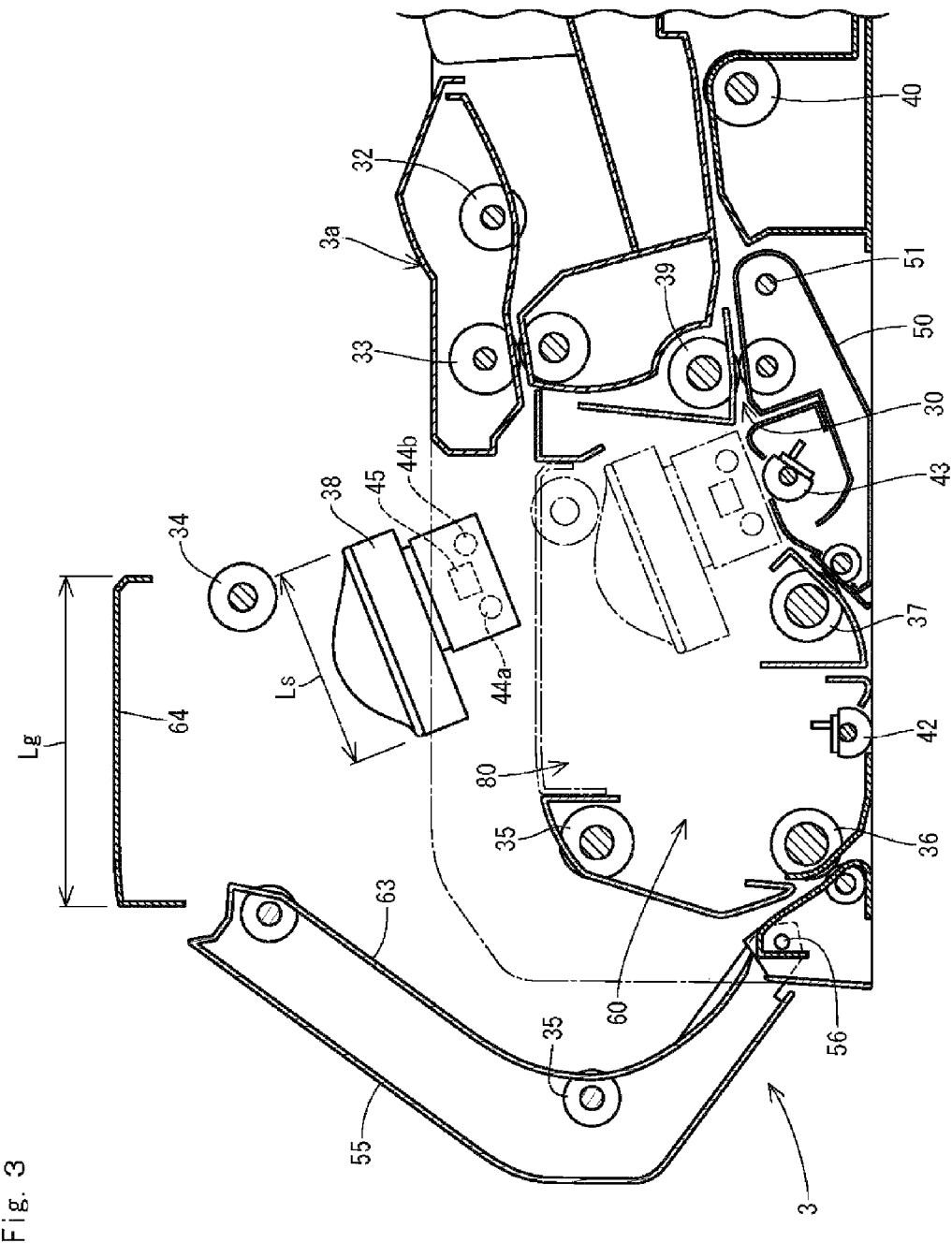
FIG. 3 is an enlarged side cross-sectional view for explaining an exchange operation of a second document reading unit.
Figure 4:
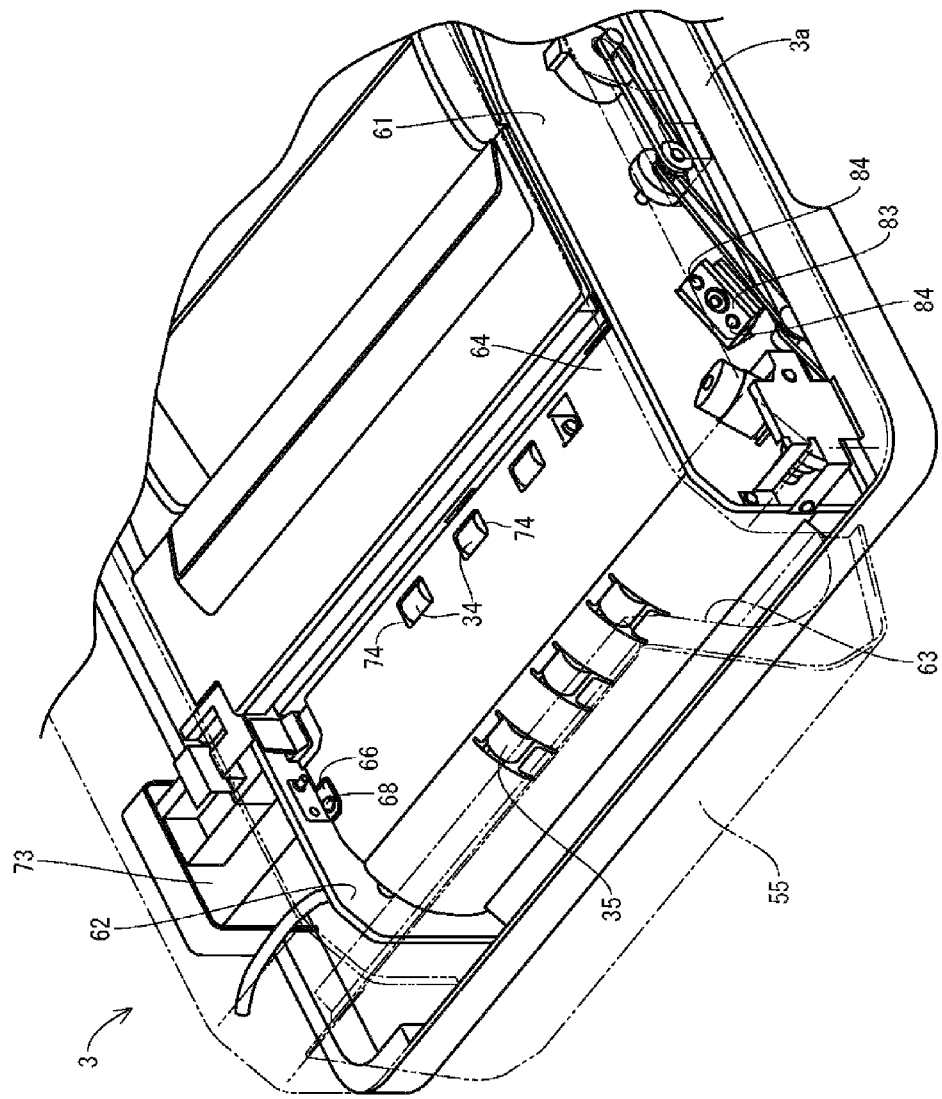
FIG. 4 is an enlarged perspective view illustrating a state where an opening and closing cover is opened.
Figure 5:
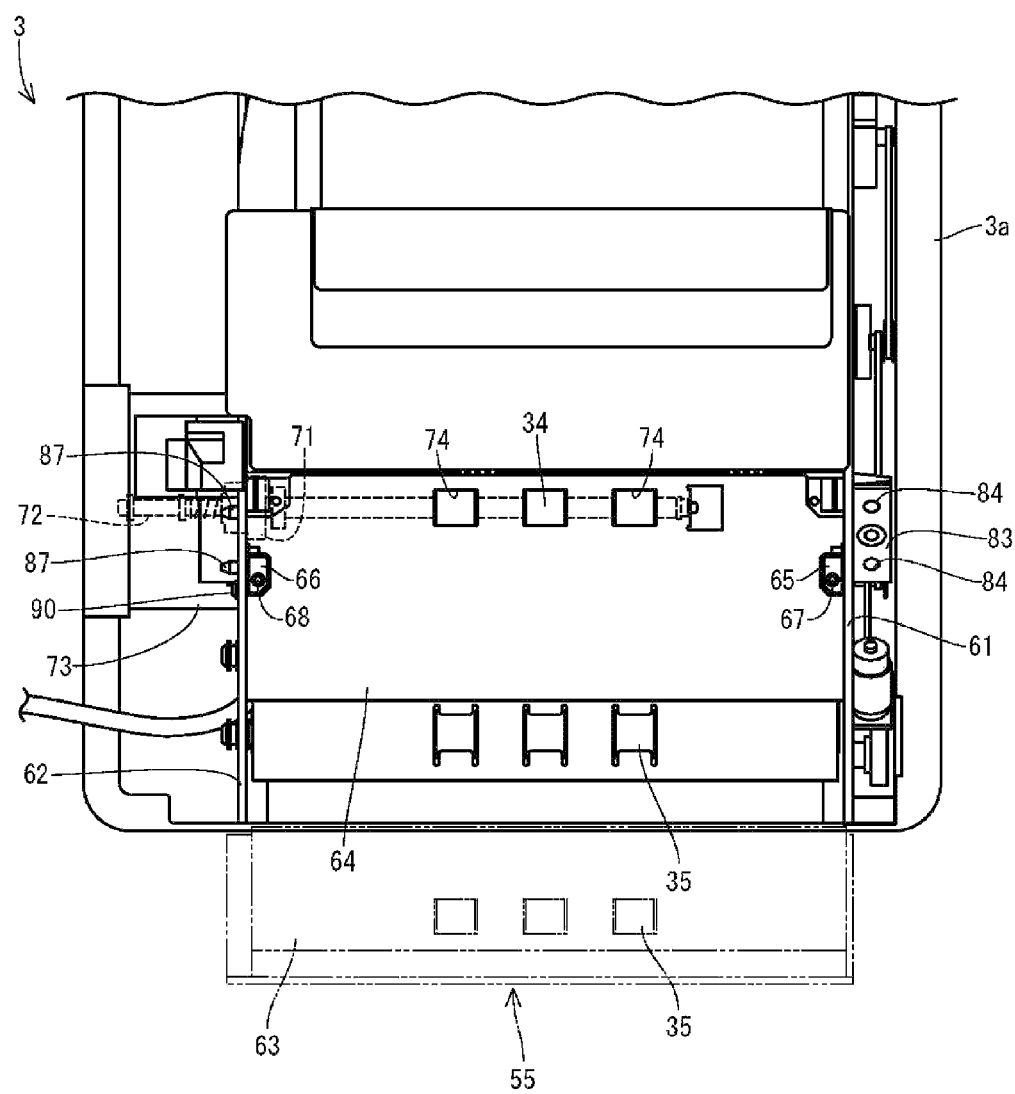
FIG. 5 is an enlarged plan view illustrating the state where the opening and closing cover is opened.

As shown in FIG. 3 to FIG. 5, a pair of guiding members 63, 64 which guide a document M to the resist roller pair 35 are provided between the sheet feeding roller pair 33 and the resist roller pair 35 in the upper portion of the accommodation chamber 60. Both of the guiding members 63, 64 constitute a part of the document transportation path 30 at the transportation upstream side (path between the sheet feeding roller pair 33 and the resist roller pair 35). An inner surface of the opening and closing cover 55 at the side of the document transportation path 30 serves a function as the outer side guiding member 63 in both of the guiding members 63, 64. The inner side guiding member 64 is a substantially flat plate member which covers an upper side of the second document reading unit 38. The inner side guiding member 64 is detachably attached to bracket fragments 65, 66 with locking screws 67, 68. The bracket fragments 65, 66 are provided in a projecting manner at the inner surface sides of the right partitioning side plate 61 and the left partitioning side plate 62, respectively. In a state where the opening and closing cover 55 is closed, the outer side guiding member 63 which is an inner surface of the opening and closing cover 55 at the side of the document transportation path 30 and the inner side guiding member 64 are opposed to each other with a slight space.

The other (lower side) of the intermediate rollers 34 is arranged at the lower side of the inner side guiding member 64 in a rotatable and detachable manner. It is to be noted that the intermediate roller 34 at the lower side of the inner side guiding member 64 is referred to as a lower intermediate roller 34 for the convenience in the description below. In this case, one end (right end) of a shaft portion on the lower intermediate roller 34 is inserted to a small diameter hole in a detachable and rotatable manner. The small diameter hole is formed on a flange provided by cutting a part of the inner side guiding member 64 into an U-shaped form and bending the cut inner side guiding member 64 downward. The other end of the lower intermediate roller 34 is held by the other flange extending from the edge of the inner side guiding member 64 so as to bend downward. On the other hand, the other end (left end) of the shaft portion on the lower intermediate roller 34 is detachably coupled to a coupling 71 inserted to a large diameter hole 70 of the left partitioning side plate 62 (see, FIG. 5). A support shaft 72 projecting outward from the coupling 71 is rotatably supported by a driving portion 73 between the housing 3a and the left partitioning side plate 62. A plurality of opening holes 74 are formed on the inner side guiding member 64. Some parts of the outer circumferential side of the lower intermediate roller 34 are exposed from the opening holes 74.

It is to be noted that the intermediate roller pair 34 is provided in relation to sizes of documents which can be fed in the MFP 1 according to the embodiment. The intermediate roller pair 34 may not be provided when a distance from the sheet feeding roller pair 33 to the resist roller pair 35 on the document transportation path 30 is short.

Figure 6:
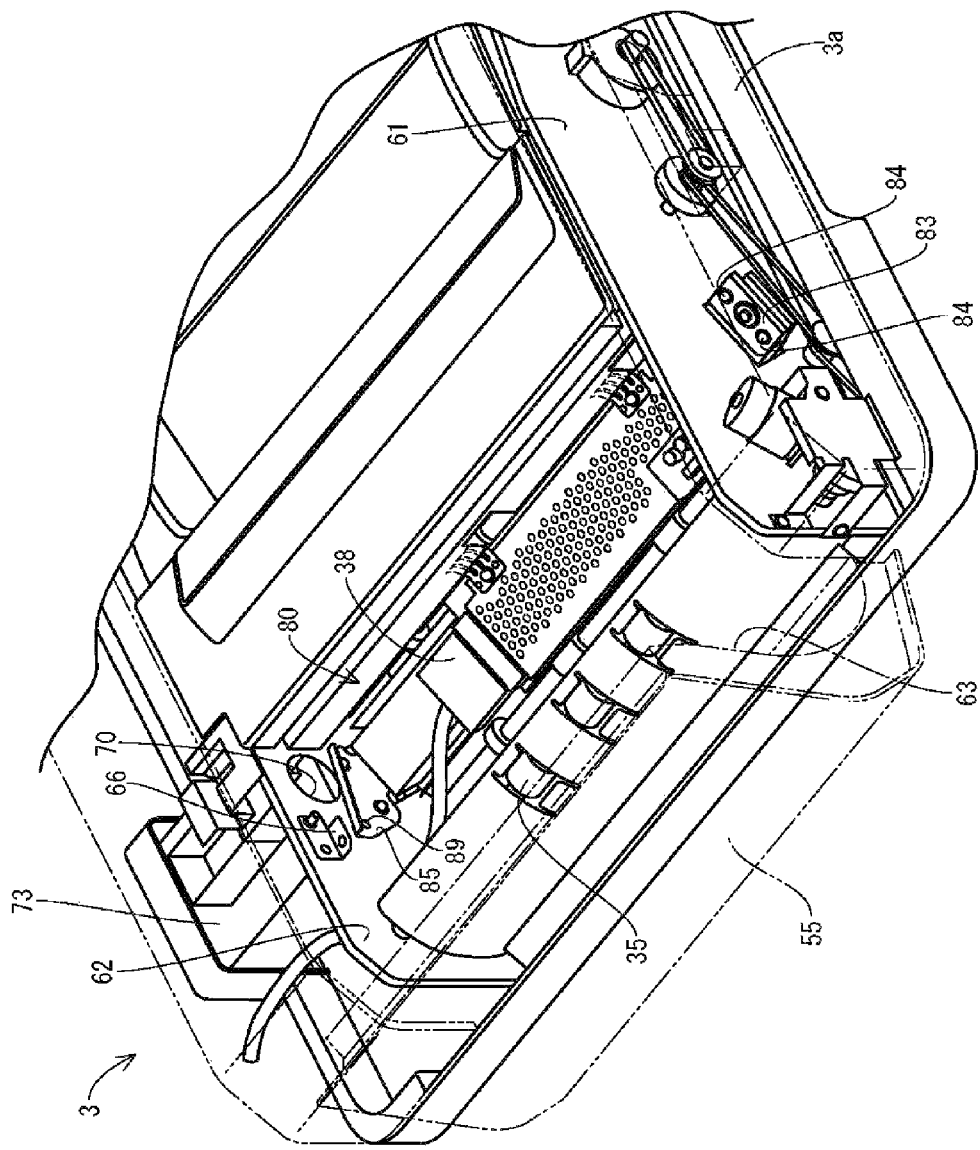
FIG. 6 is an enlarged perspective view illustrating a state where an inner side guiding member and a lower intermediate roller are detached.
Figure 7:
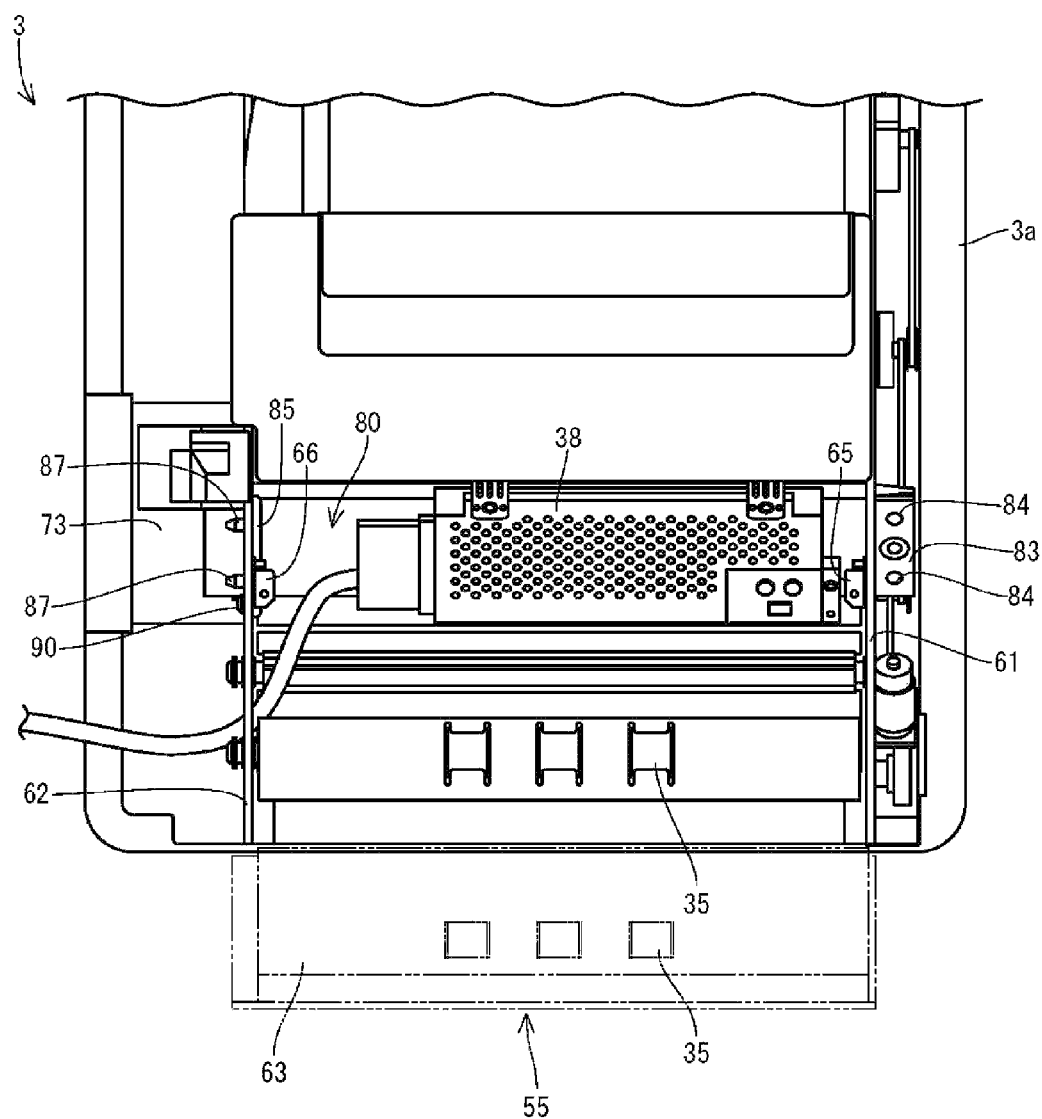
FIG. 7 is an enlarged plan view illustrating the state where the inner side guiding member and the lower intermediate roller are detached.
Figure 8:
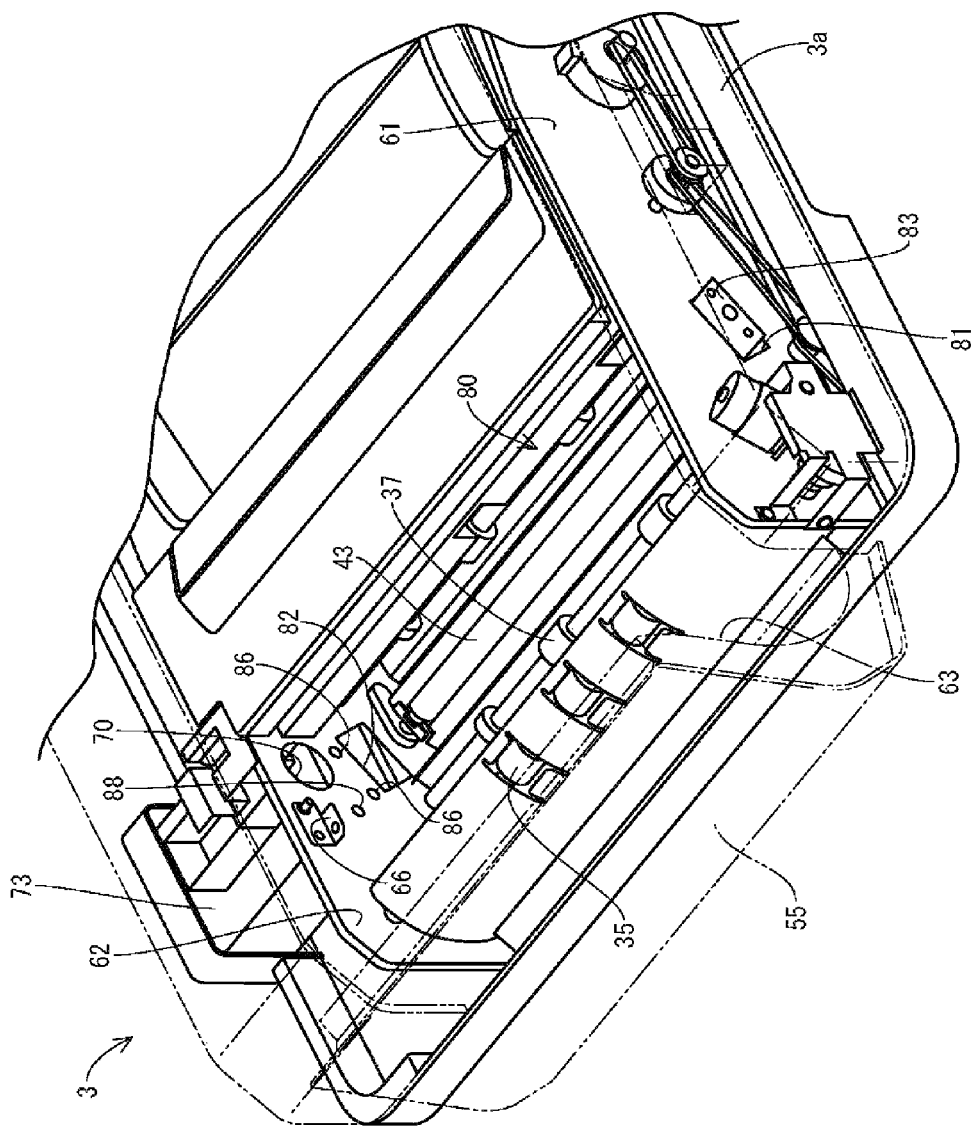
FIG. 8 is an enlarged schematic view illustrating a state where the second document reading unit is detached.
Figure 9:
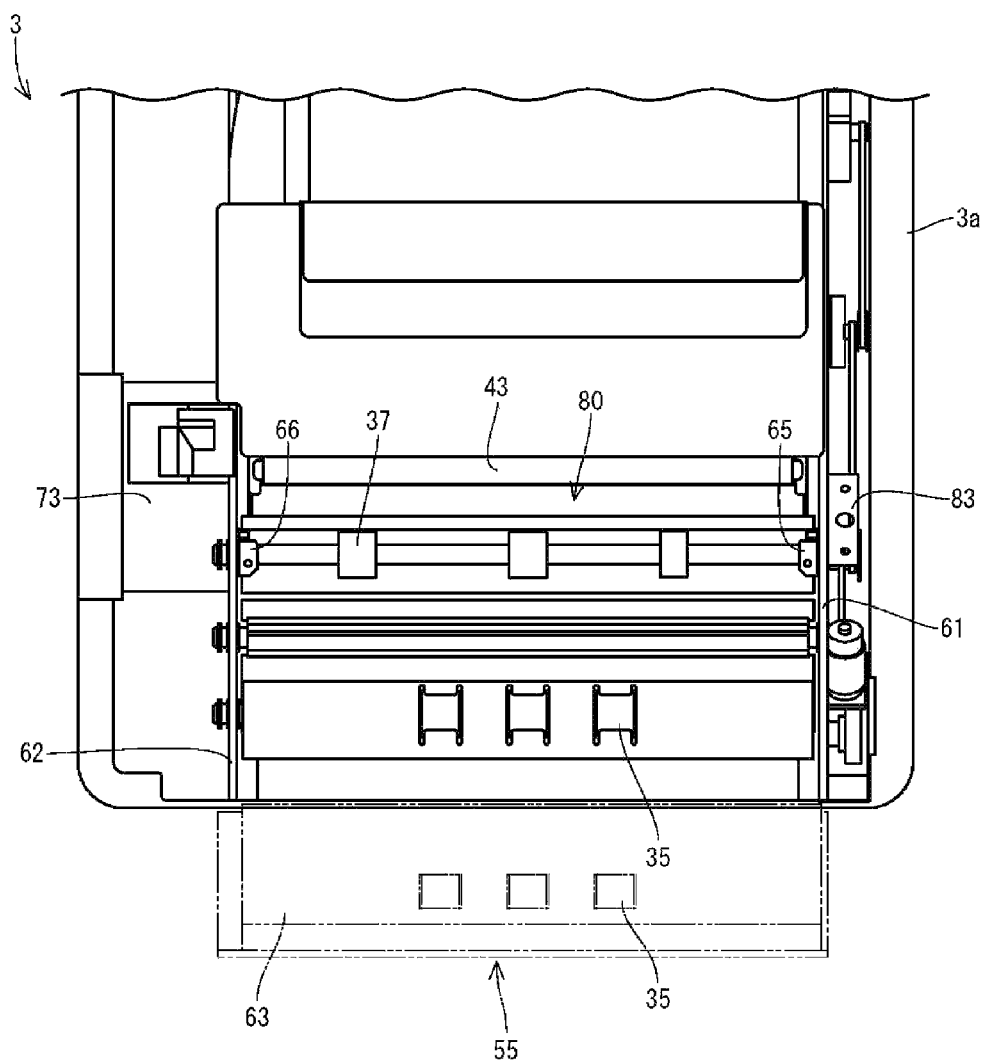
FIG. 9 is an enlarged plan view illustrating the state where the second document reading unit is detached.

As shown in FIG. 3, FIG. 6, and FIG. 7, the ADF 3 is configured to open the document transportation path 30 at the transportation upstream side with respect to the resist roller pair 35 by detaching both of the guiding members 63, 64 from positions constituting the document transportation path 30. Further, the second document reading unit 38 is exposed from the opening 80. In the embodiment, if the inner side guiding member 64 and the lower intermediate roller 34 are detached after the opening and closing cover 55 is opened, the second document reading unit 38 appears (can be seen) from the opening 80 covered by the inner side guiding member 64.

The second document reading unit 38 is long in the main scanning direction and is detachably attached to the right partitioning side plate 61 and the left partitioning side plate 62 in an exchangeable manner. When the second document reading unit 38 is exchanged (attached or detached), the second document reading unit 38 is inserted or removed from the document transportation path 30 at the transportation upstream side with respect to the resist roller pair 35. That is, the second document reading unit 38 is inserted or removed from the opening 80 covered by the inner side guiding member 64 at the time of the exchange. Namely, the second document reading unit 38 is passed through the document transportation path 30 at the transportation upstream side with respect to the resist roller pair 35 so as to be attached to and detached from the housing 3a (the right partitioning side plate 61 and the left partitioning side plate 62).

In this case, in order to easily insert and detach the second document reading unit 38 from the opening 80, a width Ls of the second document reading unit 38 in the sub scanning direction is sufficiently shorter than a width Lg of the inner side guiding member 64 in the sub scanning direction (see, FIG. 3). In addition, in order to achieve both of reduction of the ADF 3 in size and sufficient ensuring of an effective reading region of the second document reading unit 38, a length Lm of the second document reading unit 38 in the main scanning direction is longer than an internal dimension Lin of the right partitioning side plate 61 and the left partitioning side plate 62 (see, FIG. 10). One end (right end) of the second document reading unit 38 in the main scanning direction penetrates through a right rectangle hole 81 in a detachable manner. The right rectangle hole 81 is formed on a lower side of the small diameter hole 69 on the right partitioning side plate 61. On the other hand, the other end (left end) of the second document reading unit 38 in the main scanning direction penetrates through a left rectangle hole 82 in a detachable manner. The left rectangle hole 82 is formed on a lower side of the large diameter hole 70 on the left partitioning side plate 62.

A fixing plate fragment 83 is provided so as to project outward on an outer surface side of the right partitioning side plate 61 at the upper side of the right rectangle hole 81. The projected part of the second document reading unit 38 from the right rectangle hole 81 is detachably attached to the fixing plate fragment 83 at the outer surface side of the right partitioning side plate 61 with the locking screw 84 from the upper side.

A position fixing plate 85 is provided on the upper surface of the other end (light end side) of the second document reading unit 38 in the main scanning direction in a standing manner. The position fixing plate 85 abuts against an inner surface of the left partitioning side plate 62. Positioning pins 87 are provided so as to project outward on the abutment surface of the position fixing plate 85. The positioning pins 87 are fitted into positioning holes 86 which are formed on the left partitioning side plate 62. Further, a threaded screw hole 89 is provided on the position fixing plate 85. The threaded screw hole 89 is fitted to a through hole 88 of the left partitioning side plate 62 in a state where the positioning pins 87 are fitted into the positioning holes 86 of the left partitioning side plate 62. A locking screw 90 is inserted into the through hole 88 and the threaded screw hole 89 from the outer left side in a state where the position fixing plate 85 is superimposed with the inner surface side of the left partitioning side plate 62 and the positioning pins 87 of the position fixing plate 85 are fitted into the positioning holes 82 of the left partitioning side plate 62. With this, the other end (left end) of the second document reading unit 38 in the main scanning direction is detachably supported by the left partitioning side plate 62. By employing such configuration, the second document reading unit 38 is positioned while ensuring an appropriate focal depth and posture with respect to the reading roller 43. Further, the second document reading unit 38 is supported by the right partitioning side plate 61 and the left partitioning side plate 62 such that the second document reading unit 38 is suspended so as not to deviate in any directions.

4. Operation Effect

In the above configuration, when the second document reading unit 38 is detached, the opening and closing cover 55 is opened at first. Then, the locking screws 67, 68 are loosened and removed so that coupling between both of the bracket fragments 65, 66 and the inner guiding member 64 is released. Then, the inner guiding member 64 and the lower intermediate roller 34 are collectively detached so as to expose (open) the opening 80.

Figure 10:
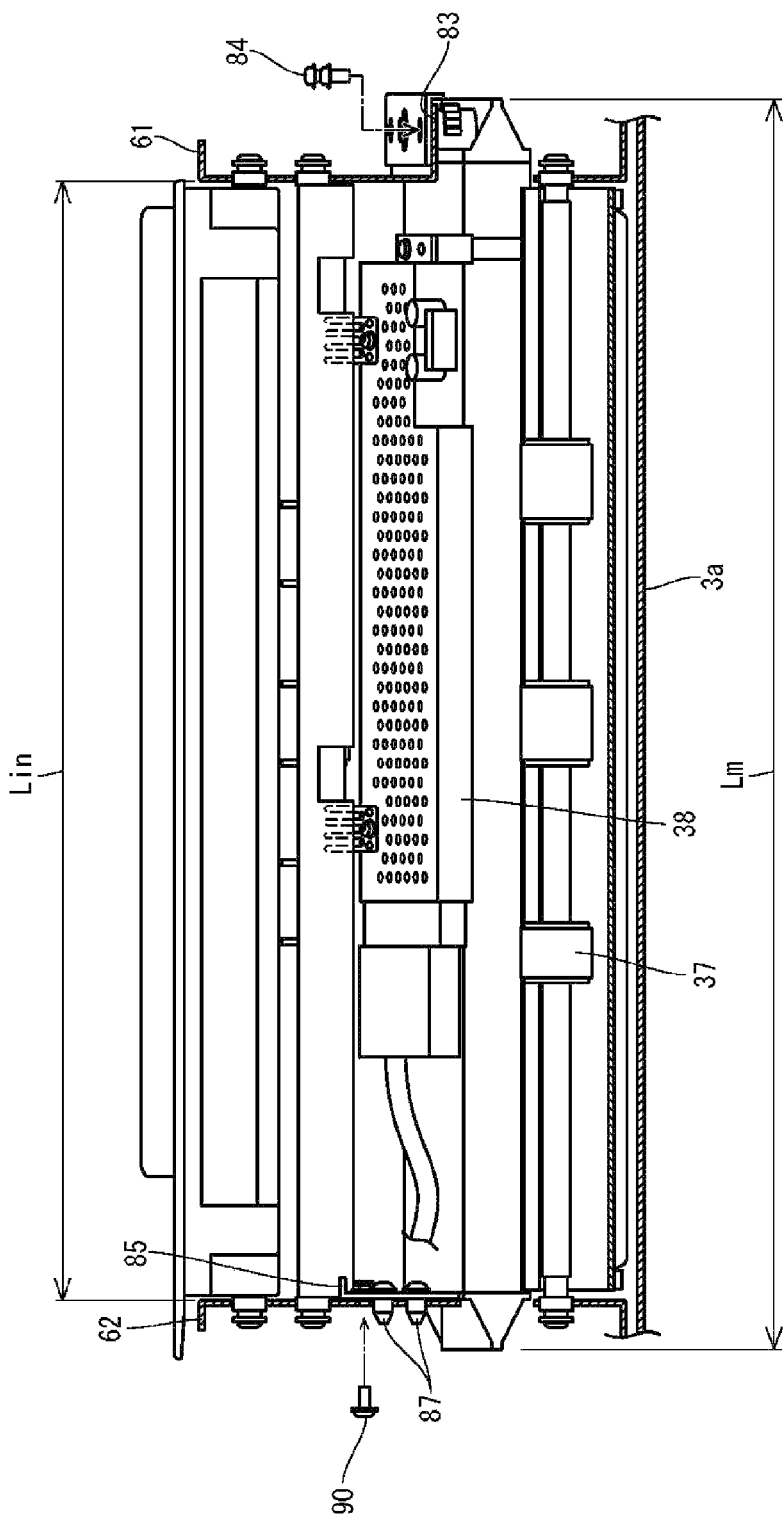
FIG. 10 is a cross-sectional view of a substantial part illustrating an attachment configuration of the second document reading unit.

Thereafter, the locking screws 84, 90 provided at outer sides of the right partitioning side plate 61 and the left partitioning side plate 62 are all loosened and removed (see, FIG. 10). Then, the second document reading unit 38 is deviated toward the right rectangle hole 81 of the right partitioning side plate 61 in such a manner that the positioning pins 87 of the position fixing plate 85 are pulled out of the positioning holes 86 of the left partitioning side plate 62. Further, the second document reading unit 38 is detached from the ADF 3 in such a manner that the other end (left end, side at which the position fixing plate 85 is provided) of the second document reading unit 38 in the main scanning direction is pulled up from the opening 80 (see, FIG. 11). When the second document reading unit 38 is attached, it is sufficient that inverse procedures of the above procedures are performed.

As is obvious from the above description, with the above configurations, the image reading apparatus 4 includes the exchangeable image reading portion 38, the document transportation path 30 curved so as to move around the image reading portion 38, the skew correction rollers 35 in the hosing 3a. The skew correction rollers 35 are arranged on the document transportation path 30 at the transportation upstream side with respect to the reading position 46 of the image reading portion 38. In the image reading apparatus 4, the image reading portion 38 passes through the document transportation path 30 at the transportation upstream side with respect to the skew correction rollers 35 so as to be detached from and attached to the housing 3a. Therefore, the image reading portion 38 (and peripheral associated parts) can be easily exchanged without detaching mechanisms which are arranged at a transportation downstream side with respect to the skew correction rollers 35, that is, mechanisms which deeply relate to a document transportation accuracy or an image reading accuracy (rollers, guiding members, and the like).

Accordingly, the following effects can be obtained with the above configurations. That is, maintenance workability of the image reading portion 38 (and peripheral associated parts) can be improved and positioning accuracy of the image reading portion 38 with respect to mechanisms which deeply relate to a document transportation accuracy or an image reading accuracy can be ensured. Further, a risk that failures such as deterioration in the image reading accuracy, skew of documents M and paper jam are caused when the image reading portion 38 is exchanged can be suppressed.

Further, a pair of guiding members 63, 64 which guide transportation of a document M are provided between the sheet feeding roller pair 33 and the skew correction rollers 35 on the document transportation path 30. Further, both the guiding members 63, 64 are detached from the positions constituting the document transportation path 30. Therefore, the document transportation path 30 at the transportation upstream side with respect to the skew correction rollers 35 is opened and the image reading portion 38 is exposed from the opening 80. With the opening 80 formed by detaching the guiding members 63, 64, a large access space for the image reading portion 38 can be ensured. Accordingly, a large effect for improving maintenance workability of the image reading portion 38 (and peripheral associated parts) can be obtained.

In addition, the opening and closing cover 55 is provided on the housing 3a. The opening and closing cover 55 can be opened and closed so as to expose or cover the document transportation path 30 at the transportation upstream side with respect to the reading position 46 of the image reading portion 38. The opening and closing cover 55 at the side of the document transportation path 30 constitutes the one guiding member 63 and the other guiding member 64 is detachably attached to the housing 3a. Therefore, when paper jam is removed, for example, a configuration of the opening and closing cover 55 to be opened is effectively utilized so that the document transportation path 30 at the transportation upstream side with respect to the skew correction roller 35 can be opened. Accordingly, a configuration in which both of the guiding members 63, 64 are detached from the positions constituting the document transportation path 30 can be simplified so as to contribute to cost reduction.

5. Others

Some examples relating to the invention have been described above, but the invention is not limited to the above description. For example, in the above embodiment, a case where the image forming apparatus MFP 1 is an apparatus having a multiple functions including a copying function, a facsimile function, a printer function, and a scanner function is described. However, the image forming apparatus MFP 1 is not required to have all the plurality of functions. In particular, the image reading apparatus 4 can be applied to an apparatus including at least one function of the copying function, the facsimile function, and the scanner function. Further, each of the guiding members 63, 64 may be opened or closed rotationally or detachably attached. In short, it is sufficient that each of the guiding members 63, 64 have a configuration so as to be separated from a position constituting the document transportation path 30. Moreover, a configuration of each part is not limited to the embodiment shown in the drawings and can be variously modified in a range without departing from a scope of the invention.

What is claimed is:

1. An image reading apparatus comprising:
an exchangeable image reading portion; a document transportation path which is curved so as to move around the image reading portion; and a skew correction roller which is arranged on the document transportation path at a transportation upstream side with respect to a reading position of the image reading portion, wherein the exchangeable image reading portion, the document transportation path and the skew correction roller are provided in a housing of the image reading apparatus, and the image reading portion is enable to pass through the document transportation path at the transportation upstream side with respect to the skew correction roller so as to be detached from and attached to the housing; and wherein a pair of guiding members which guide transportation of a document are provided between a sheet feeding roller and the skew correction roller on the document transportation path, and the document transportation path at the transportation upstream side with respect to the skew correction roller is opened and the image reading portion is exposed from the opening by detaching both the guiding members from the positions constituting the document transportation path.

2. The image reading apparatus according to claim 1, wherein an opening and closing cover which is capable of being opened and closed so as to expose or cover the document transportation path at the transportation upstream side with respect to the reading position of the image reading portion is provided and the opening and closing cover at the side of the document transportation path constitutes the one guiding member and the other guiding member is detachably attached to the housing.

* * * * *